US00RE43225E

(19) United States
(12) Reissued Patent
Parker et al.

(10) Patent Number: US RE43,225 E
(45) Date of Reissued Patent: *Mar. 6, 2012

(54) METHOD AND APPARATUS FOR ENHANCING AN IMAGE USING DATA OPTIMIZATION AND SEGMENTATION

(75) Inventors: Dennis L. Parker, Centerville, UT (US); Andrew L. Alexander, Madison, WI (US); John A. Roberts, Salt Lake City, UT (US); Brian E. Chapman, San Diego, CA (US)

(73) Assignee: University of Utah Research Foundation, Salt Lake City, UT (US)

( * ) Notice: This patent is subject to a terminal disclaimer.

(21) Appl. No.: 12/249,583

(22) Filed: Oct. 10, 2008

Related U.S. Patent Documents

Reissue of:
(64) Patent No.: 7,120,290
Issued: Oct. 10, 2006
Appl. No.: 10/692,133
Filed: Oct. 23, 2003

U.S. Applications:
(63) Continuation of application No. 09/959,236, filed as application No. PCT/US00/10532 on Apr. 19, 2000, now Pat. No. 6,674,894.

(60) Provisional application No. 60/130,226, filed on Apr. 20, 1999.

(51) Int. Cl.
*G06K 9/00* (2006.01)

(52) U.S. Cl. ..... 382/154; 382/128; 382/264; 382/278; 348/79; 359/368; 358/1.2; 358/3.27

(58) Field of Classification Search ..... 382/128, 382/145, 129, 154, 260, 263, 264, 274, 275; 358/1.2, 3.26, 3.27, 463
See application file for complete search history.

(56) References Cited

U.S. PATENT DOCUMENTS

| | | | | |
|---|---|---|---|---|
| 5,201,035 | A | 4/1993 | Stytz et al. | |
| 5,271,094 | A | 12/1993 | Albaugh et al. | |
| 5,402,532 | A | 3/1995 | Epstein et al. | |
| 5,544,650 | A | 8/1996 | Boon et al. | |
| 5,644,689 | A | 7/1997 | Ban et al. | |
| 5,649,061 | A | 7/1997 | Symth | |
| 5,757,954 | A | 5/1998 | Kuan et al. | |
| 5,825,363 | A | 10/1998 | Anderson | |
| 6,028,955 | A | 2/2000 | Cohen et al. | |
| 6,031,941 | A | 2/2000 | Yano et al. | |
| 6,275,718 | B1 * | 8/2001 | Lempert | 600/407 |
| 6,430,309 | B1 | 8/2002 | Pressman et al. | |
| 6,456,285 | B2 | 9/2002 | Hayhurst | |
| 6,674,884 | B2 | 1/2004 | Bacus et al. | |
| 6,750,974 | B2 * | 6/2004 | Svetkoff et al. | 356/602 |
| 6,768,811 | B2 * | 7/2004 | Dinstein et al. | 382/128 |
| 6,919,892 | B1 * | 7/2005 | Cheiky et al. | 345/473 |

* cited by examiner

*Primary Examiner* — Yosef Kassa
(74) *Attorney, Agent, or Firm* — Stolowitz Ford Cowger LLP

(57) ABSTRACT

A method and system are disclosed for generating enhanced images of multiple dimensional data using a depth-buffer segmentation process. The method and system operate in a computer system modify the image by generating a reduced-dimensionality image data set from a multidimensional image by formulating a set of projection paths through image points selected from the multidimensional image, selecting an image point along each projection path, analyzing each image point to determine spatial similarities with at least one other point adjacent to the selected image point in a given dimension, and grouping the image point with the adjacent point or spatial similarities between the points is found thereby defining the data set.

68 Claims, 12 Drawing Sheets

410

420

METHOD AND APPARATUS FOR ENHANCING AN IMAGE USING DATA OPTIMIZATION AND SEGMENTATION

Matter enclosed in heavy brackets [ ] appears in the original patent but forms no part of this reissue specification; matter printed in italics indicates the additions made by reissue.

CROSS-REFERENCE TO RELATED APPLICATIONS

This application is *a reissue of U.S. application Ser. No. 10/692,133, filed Oct. 23, 2003, now U.S. Pat. No. 7,120,290, which is* a continuation application of U.S. patent application Ser. No. 09/959,236, filed Oct. 16, 2001 now U.S. Pat. No. 6,674,894, and entitled "METHOD AND APPARATUS FOR ENHANCING AN IMAGE USING DATA OPTIMIZATION AND SEGMENTATION," which was the U.S. National Stage application of PCT US00/10532, filed Apr. 19, 2000, and entitled "METHOD AND APPARATUS FOR ENHANCING AN IMAGE USING DATA OPTIMIZATION AND SEGMENTATION," which claimed priority to U.S. Provisional Application No. 60/130,226, filed on Apr. 20, 1999. The entireties of all of these priority applications are hereby incorporated by reference.

The U.S. Government has license rights in this invention and the right in limited circumstances to require the patent owner to license others on reasonable terms, as provided for by the terms of Contract No. R01EB002639, awarded by the National Institutes of Health.

BACKGROUND OF THE INVENTION

The present invention relates generally to data image processing and, more specifically, to generating enhanced digital images utilizing image segmentation processes that involve depth buffer information in association with point selection projection images.

The development of high resolution 3D (three-dimensional) imaging techniques, such as magnetic resonance imaging (MRI), computed tomography (CT), and rotation X-ray CT angiography (XRCTA), have led to situations where high volumes of image data are generated in the study of individual patients. In many cases, such as in 3D magnetic resonance angiography (MRA) and 3D CT angiography (CTA), the amount of detail per two-dimensional slice is small, but the high resolution detail of the full image volume is required in the diagnostic process. In one example, arterial beds are generally sparse, so there is typically a large amount of nonvascular image data present in a 3D angiographic image. As the resolution and volume coverage of MRA examinations have increased recently, having adequate means to effectively and efficiently review the available image information is a significant challenge for radiologists. Currently, there are three primary display techniques used for clinical evaluation of MRA data. The first technique is to display selected original cross-sectional MRA images. The second technique is to display oblique planar reformatted images. The last technique is to display a maximum intensity projection (MIP) image. The following discussion focuses mostly on MRA images; however, the discussion is equally applicable to other 3D angiography techniques such as CTA and XRCTA and to other volumetric visualization techniques in which selectable groups of image points are of interest.

The original cross-sectional images, also referred to as slices, contain the maximum amount of information on a local level. Each image displays the transverse segments and cross sections of vessels that intersect the plane of the image. Sometimes, the vascular detail of interest may be observed in a single image. More often, because of the intricate paths of the vessels, many images must be viewed, and the information from each image must be integrated to formulate an understanding of the structure of interest. This method is inefficient since it requires a single slice to be displayed, which slice contains very little global information about any single intricate vessel in the overall vascular network.

The oblique planar reformatted images provide improved efficiency over the original images by displaying image planes that follow a segment of a vessel of interest through the three-dimensional image data. Each individual image still provides only local information and a complete view of the vascular bed is not obtained.

Volume rendering consists of the projection or rendering of an entire 3D image volume onto a single two-dimensional image. The volume is projected along parallel or diverging lines through the three-dimensional volume onto a two-dimensional image. The intensities along the projection line are transformed according to some specified transformation. Such rendering, in a variety of forms, has become very useful in assisting the observer in the rapid and efficient interpretation of the large amounts of image data originally obtained. A simple form of volume rendering, which is also intuitive, is an X-ray-like summation of the image densities or intensities. Initial attempts at MRA found that when the summation type of volume rendering was used, the background signal was too large to the point of masking a majority of vascular details during the summation process. The display capabilities were improved to the point where useful vascular details were observable when the rendering was performed by selecting only the maximum image value encountered along each projection line. This approach is known as the maximum intensity projection (MIP) algorithm and has been used in the development of a variety of MRA techniques. Other forms of volume rendering, such as assigning opacities and translucensies to certain image values or regions of image values, have been applied and found useful. However, the MIP algorithm is dominant because of its simplicity and consistency in generating quality images.

The MIP algorithm is successful to the extent that the signal from vessels is greater than the signal of the surrounding tissues. In regions where vessels do not appear overlapped, the MIP algorithm is sufficient to display vessels that are hyperintense relative to the variations in the overall background. Unfortunately, the MIP algorithm does not provide any information about vessels that are hidden below the intensity of other structures. Because of the sparseness of vessels, there is a significant amount of vessel detail that is not hidden and the MIP performs very well in increasing the amount of vessel detail observed in a single image.

Although there is a loss of information in a MIP image, the MIP algorithm provides a large amount of useful information in a single display. The information density, or information content per image element, is much higher in a MIP image than in the original 3D source data. In other words, although the source image data contains more total information, including some small arteries that would not appear in the MIP image, the density of vessel information in the source image data (i.e. the percentage of image elements associated with vessels) is lower than in the MIP image. As discussed later, many investigators have tried to develop algorithms to overcome the limitations of the MIP algorithm, and, although these have been viewed as improvements, the improvements have not been sufficient for any of these algorithms to replace the MIP algorithm. The advantages of the MIP algorithm typically outweigh the disadvantages found therein. These advantages include reduced dynamic range, generally consistent image display, and improved signal difference to noise ratio (SDNR or contrast to noise ratio) for vessels that appear in the MIP. The artifacts in the MIP, although very real, are also well understood and can be "read through."

The MIP display contains a large amount of global information about the vascular system. The appearance of a MIP image is quite similar to that of an X-ray angiogram, but there are several differences. The MIP simply selects the image element with the maximum intensity along each projection line, while the X-ray projection is a summation of all densitometric information along each projection line. The MIP image is therefore a flat display having no depth information and no information about the thickness of the vessel through which the projection line passed, while in X-ray angiography the vessel brightness or darkness depends directly on the length of the X-ray projection path through the vessel. Thus, in regions where several vessels are overlapping in the MIP image, it is difficult to resolve specific vessel segments. Further, because the signal intensity is not related to the projection path length through the vessel, an increase in vessel signal is not observed for foreshortened vessels. There are other limitations that exist in the MIP algorithm. Statistical nosie properties associated with the signal of the tissue background cause the signal level of the background in the MIP to increase with the projection volume thickness. Consequently, small vessels with signal levels that are slightly above the local background signal level may be lower than other background image elements along the projection line and, therefore, may not be observed in the MIP images. The limitations of the MIP can make it necessary to also review the original low information density cross-sectional images. When used in combination, the two display formats are a means for detecting and evaluating many types of vascular pathology. The review process, however, is rather time consuming, especially for complex cases.

Various attempts have been made to overcome the deficiencies that exist in the MIP algorithm. The appearance of small vessels in the MIP image can be improved by the use of zero filled interpolation (ZFI). The problem addressed by ZFI is that the arbitrary positions of the vessels relative to the reconstruction grid cause small vessels or vessel borders to be poorly rendered in the image due to the weighting of the voxel sensitivity function. ZFI reconstructs the image on a grid that is finer than the acquisition grid, thereby reducing vessel jaggedness in the MIP image caused by partial volume effects and improving vessel continuity and visibility in the MIP image for subvoxel-sized vessels.

Other attempts to overcome the problems inherent in the MIP algorithm and to improve the two-dimensional rendering of MRA image data range from simple modifications of the MIP algorithm, to attempts at complete segmentation and redisplay of the vascular information contained in the original MRA data. These attempts include utilizing the traveling or sliding slab MIP technique; preprocessing the original MRA image data before application of the MIP algorithm; line-based segmentation, where the vessel voxels are segmented from the background image data, which is also similar to segmentation work performed in other fields; intensity based segmentation, where the vessel voxels are segmented based upon relative intensities and proximity in 3D; and interactive intensity based segmentation, where vessel voxels that cannot be segmented based upon intensity are displayed over a wider gray scale range than those that can be segmented.

MRA display capabilities are also useful in a number of intracranial applications. There are various disease processes for which the diagnosis can benefit from improved image display capabilities. These diagnostic capabilities include predicting the need for thrombolysis in stroke conditions, diagnosing vasculitis and other occlusive diseases, identifying intracranial tumors and arterial venous malformations, and performing preoperative assessments. Further, MRA and other 3D angiographic images provide useful assistance for surgical procedures. The display of catheter angiograms and/or MRA image data have been found to be important aids during aneurysm surgery. The usefulness of the display of 3D angiographic image data during surgery can be enhanced by the display of the angiographic images in conjunction with 3D images of other types of anatomy such as adjacent bone structures or critical organs.

SUMMARY OF THE INVENTION

According to the present invention, a method and system are disclosed for enhancing and segmenting a multi-dimensional image based upon the depth buffer (or "Z-buffer") that is generated in conjunction with a maximum intensity projection (or related point selection projection) operation through the multi-dimensional image. This enhancement and segmentation is referred to as the depth-buffer segmentation (DBS) process. The DBS process segments an MRA image volume into regions having a likelihood of vessel occupation and regions that are unlikely to contain vessels. The process reduces the total image volume to a much smaller volume so that the amount of territory that a user must cover is greatly reduced. In addition, projection images of the vascular information found within the data become much more refined and visible when the background regions have been removed.

The DBS process merges the global properties of the MIP process with the local properties of continuity to achieve a high specificity in the segmentation of vessel voxels from background voxels while maintaining a high sensitivity. The segmentation provides an accurate and robust view of the vessel structure and filters out most of the non-vessel regions in the image. After the vascular detail is segmented, it can then be converted back to image data for display—for example, as a densitometric summation of the MRA image data resembling that of an X-ray angiogram. In an optional step, the dynamic range of the display is reduced by hollowing out the vessel structures and displaying the vascular details as X-ray projection through hollow tubes. Further, the image may be modified by adding a degree of shading so that the 3D vessel structure is apparent in a manner not visible in X-ray images. Such image shading was not possible in the MIP process.

In one embodiment, the method generates a reduced dimensionality image data set from a multi-dimensional image by formulating a set of projection paths through image points selected from the multi-dimensional image, selecting an image point along each projection path, analyzing each image point to determine spacial similarities with at least one other point adjacent to the selected image point in a given dimension, and grouping the image point with the adjacent point or spacial similarities between the points is found thereby defining the data set. The method, within the analyzing step, the step of determining similarity of brightness between the image point and the adjacent point. Further, the analyzing step also determines similarity of smoothness between the image point and the adjacent point. In one example, the smoothness is determined by using a least squares fit of adjacent image points. In yet an alternative embodiment, the method further includes selecting another image point along the projection path and performing the analyzing and grouping steps on the newly selected image point. Further still, the method may also convert the grouped and ungrouped image points into a multi-dimensional image and then perform region growing within the converted multi-dimensional image or perform hollowing-out of the multi-dimensional image for image enhancement. Another image enhancement steps include removing all pixels that are surrounded on each side by an adjacent pixel prior to displaying the image of the merged and unmerged image points.

The system further defines an image processing apparatus that comprises means for defining a set of projection paths through a multi-dimensional image, means for selecting at least one point, along each projection path, based upon a specified criterion, means for formulating an array of projection values corresponding to the positions of selected points along their respective projection path, and means for grouping a selected number of projection values based upon their proximity to other projection values. The apparatus essentially is a programmable computer system that loads a particular software program capable of implementing the steps of the method claims within a computer architecture environment for manipulating the data and processing it for imaging, whether the imaging is in a printed image or a displayed image, such as on a computer monitor. Further still, the method may be implemented in a computer program product for sale or distribution, whether that product is in a portable medium or in a fixed medium or remote medium that is communicated via a communications source, such as the Internet or other communication means known to those skilled in the art.

BRIEF DESCRIPTION OF THE DRAWINGS

The foregoing will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 6 illustrates example line segments used for the least squares fit roughness calculation, FIG. 7 illustrates image brightness inversely proportional to the roughness values in accordance with the present invention, and FIG. 8 illustrates the same region with brightness set proportional to group size after grouping low roughness pixels that have similar depth values—i.e. have connectivity in the Z-buffer;

FIG. 9 is a brightness inversely proportional to the roughness value in accordance with the present invention, FIG. 10 is a brightness based upon number of points connected in the Z-buffer, where connectivity is based upon local smoothness and proximity in the depth or "Z" direction, and FIG. 11 is a brightness proportional to number of points connected after connectivity has been enhanced by the 3D region growing process;

FIG. 16 is the DP of all segmented vessels, FIG. 17 is the anterior circulation, and FIG. 18 is a combination of DP and shaded surface display of a hollow representation of the DBS segmentation of the anterior and posterior circulations;

DETAILED DESCRIPTION OF SPECIFIC EMBODIMENTS

It will be readily understood that the components of the present invention, as generally described and illustrated in the figures herein, could be arranged and designed in a wide variety of different configurations. Thus, the following more detailed description of the embodiments of the system and method of the present invention, as represented in FIGS. 1 through 26, is not intended to limit the scope of the invention, as claimed, but is merely representative of the presently preferred embodiments of the invention. Likewise, the following description focuses on the capability of the present invention to isolate blood vessels for enhanced angiographic imaging, but this is not intended to limit the potential uses for which the invention may be of value to only those examples given.

The presently described embodiments of the invention will be best understood by reference to the drawings, wherein like parts are designated by like numerals throughout.

Figure 1:
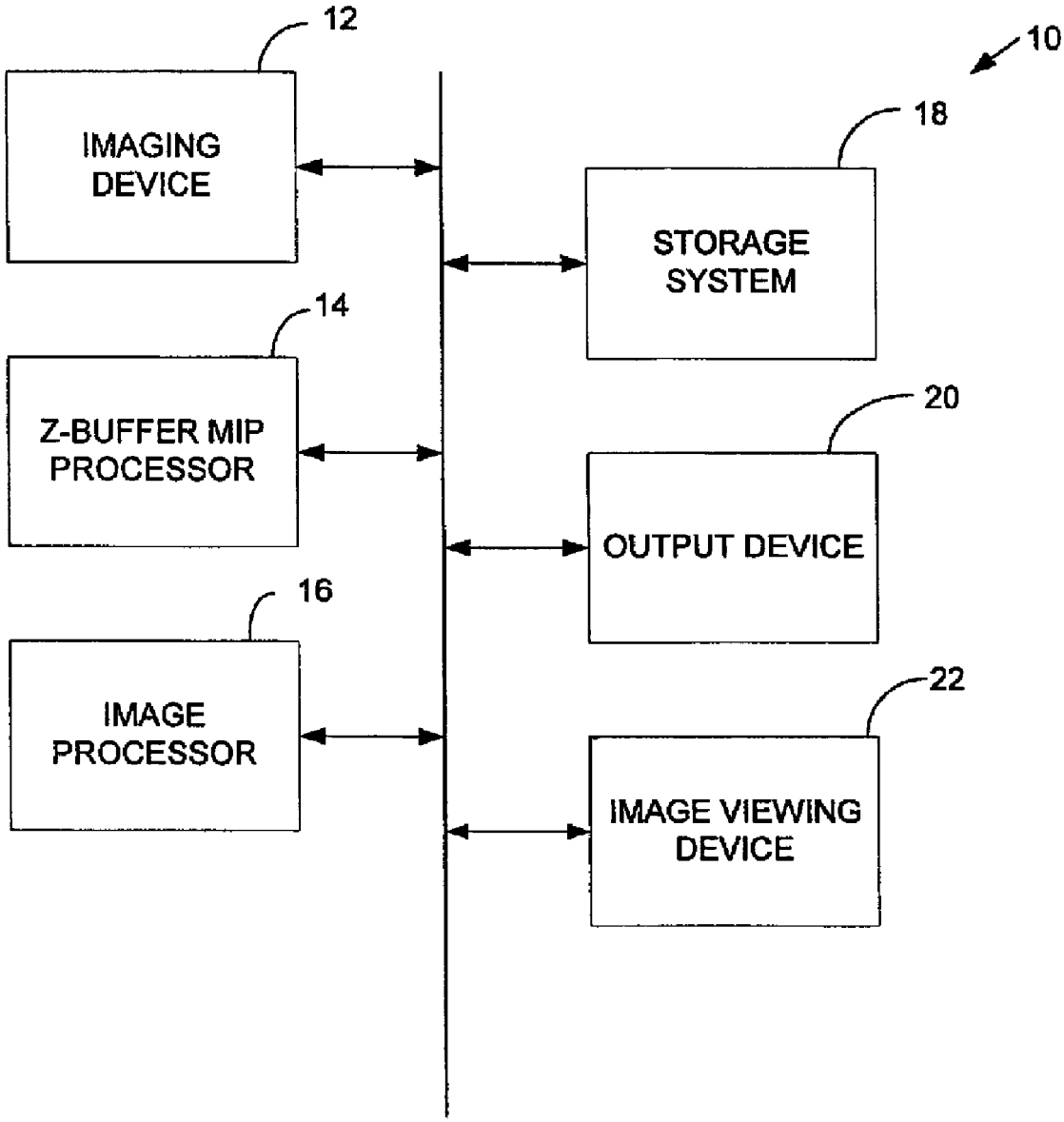
FIG. 1 illustrates a block diagram of the imaging system utilizing depth-buffer (or Z-buffer) segmentation in accordance with the present invention.

FIG. 1 illustrates a block diagram of an imaging apparatus 10 in accordance with the present invention. Imaging apparatus 10 comprises an imaging device 12, a Z-buffer MIP processor 14, an image processor 16, a storage system 18, output device 20, and image viewing device 22. Each element is connected with at least one other element within apparatus 10 or, alternatively, each element is connected to a common bus 23 that allows communication to and from each element with any other element within apparatus 10.

Imaging device 12 typically is a magnetic resonance imaging (MRI) system or a computed tomography (CT) system or a rotational X-ray CT angiography (XRCTA) system used in generating 3D images in a non-invasive manner of a subject, such as an object or a patient, which images can be stored in computer manipulable form for subsequent processing and display. Z-Buffer MIP processor 14 and storage system 18 are typically selected as a personal computer-type system or work station. One such system includes a personal computer based on the Advanced Micro Devices (AMD) Athlon 650 megahertz CPU with a storage system comprising 128 megabytes of RAM and a 20 gigabyte long-term storage hard drive. Alternatively, the computer system can be selected from other known computer systems as previously mentioned, such as for example, a work station like that provided by Sun Computers, such as their UltraSpark Platform. The computer system further incorporates the image processor 16. One image processor suitable for use is provided by Mitsubishi and is known as the VP 5003D graphic accelerator. The personal computer system operates in a Windows NT operating system environment. Other operating systems include Windows 98 and Windows 2000, which are both provided by Microsoft of Redmond, Wash. Further, the invention can be implemented on an Apple compatible system running under OS 9 and configured in a comparable manner to the personal computer mentioned above.

Output device 20 can include such items as a printer system or removable storage device. The printing systems typically utilized as output devices offer a high quality output such as those found in digital photography printers. Other printers, including low resolution laser printers, would also be acceptable in some situations. Typically, however, the use of better resolution in printing is desirable. Image viewing device 22 typically is a video monitor. The monitor typically is a high resolution monitor given the large amount of image detail that is of interest. The depth-buffer segmentation process makes it feasible to include a graphical user interface to allow a user to select different viewing options, different angles of view, rotational viewing options, and other animation-type viewing options, which enhance and optimize the viewing needs of the user.

The operation of apparatus 10, as well as the process for converting raw image data information into a useful depth-buffer segmentation (DBS) image, is shown in the flow diagram of FIG. 2 and is presented in greater detail below in accordance with the present invention. In order to begin processing an image, an image must be generated or taken of the subject matter to be examined. The image or images can come from various imaging modalities. These modalities can be selected from magnetic resonance imaging systems or other 3D imaging systems. Other imaging modalities include computed tomography (CT), computed tomography angiography (CTA), and X-ray CT angiography (XRCTA) as well as other types of 3D imaging systems known to those skilled in the art. Further, it is the image data itself that is useful and processed as will be shown below.

In experiments made to evaluate the process of the present invention, image data acquisition was performed as part of an aneurysm imaging protocol. The imaging was performed on a 1.5 Tesla (T) General Electric model Signa MRI scanner with actively shielded gradients. The gradient system operates with a maximum strength of 23 milli-Tesla/meter (mT/m) and a slew rate of 77 milli-Tesla/meter/millisecond (mT/m/ms) on all three axes for the MRA sequence. An optimized cylindrical birdcage transmit/receive coil with an RF mirror endcap is used. Generally, the image is acquired in any desired technique, one of which is illustrated in the acquisition of step 212, which uses a three-dimensional time-of-flight (TOF) sequence. The 3D TOF sequence incorporates imaging techniques such as abbreviated magnetization transfer, flow compensation in the frequency and slice-encode directions, and RF spoiling, which are understood by those skilled in the art. For this image acquisition process, the imaging parameters used and that are understood by those skilled in the art were: repetition time ($T_R$)=48 msec, echo time ($T_E$)=5.3 msec, readout bandwidth (RBW)=±16 kHz, "in-plane" matrix=512×192 image elements, field of view (FOV)=220×165 $mm^2$.

The next step, step 214, although optional for the present invention, applies zero filled interpolation in all 3 image directions. After the optional interpolation, step 216 applies MIP processing to the 3D image data. MIP processing involves generating a 2D image from the 3D image, where the image value selected for each point in the 2D image is the maximum (or minimum) image value found along a corresponding line through the 3D image. The MIP projection lines may all be parallel, as in a parallel ray MIP image, or the lines may be non-parallel and for example might diverge from a single source point as in a divergent ray MIP image or in curvilinear space as well.

Figure 3:
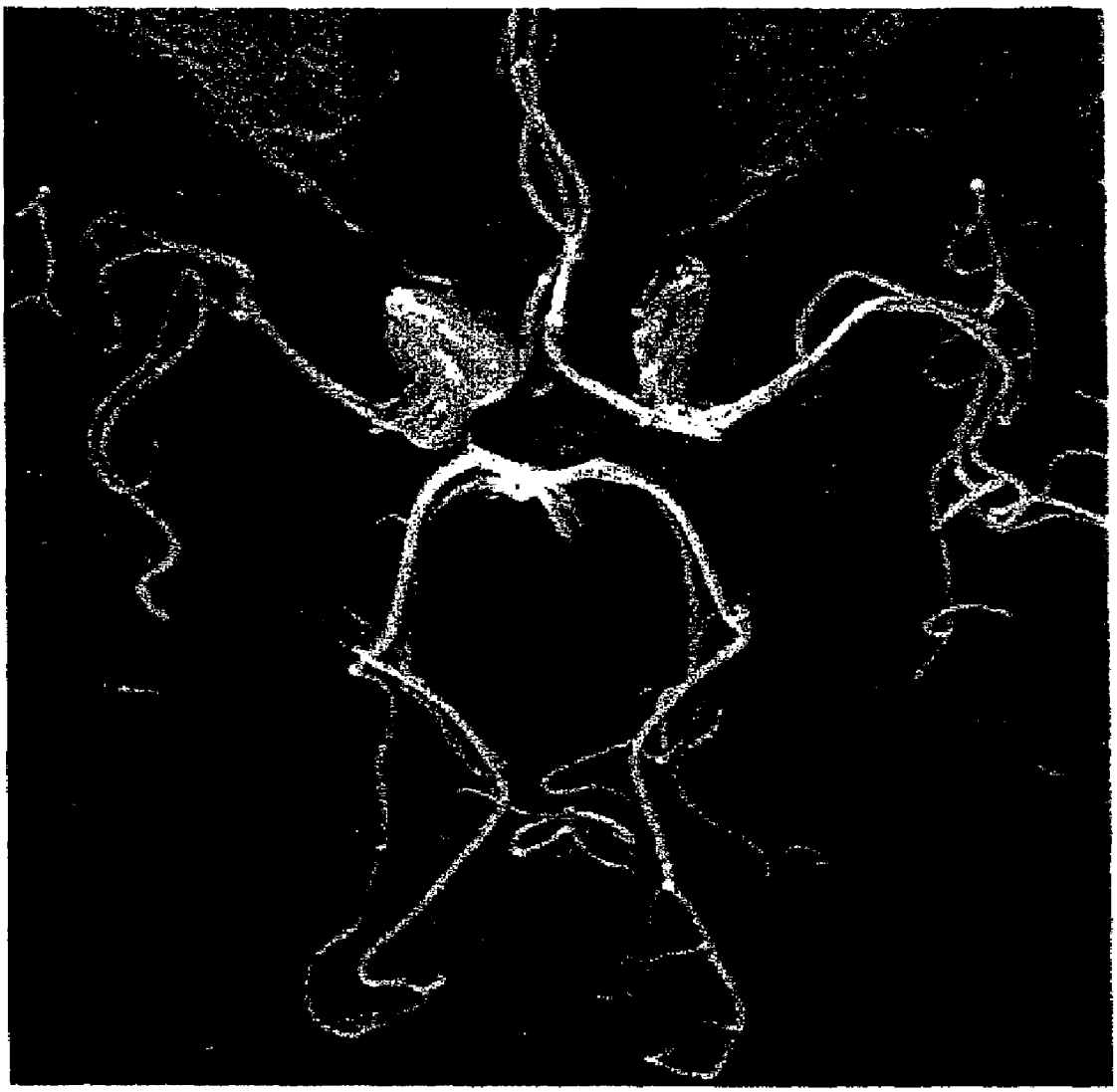
FIG. 3 illustrates a standard axial MIP image of a patient with a large ophthalmic artery aneurysm.
Figure 4:
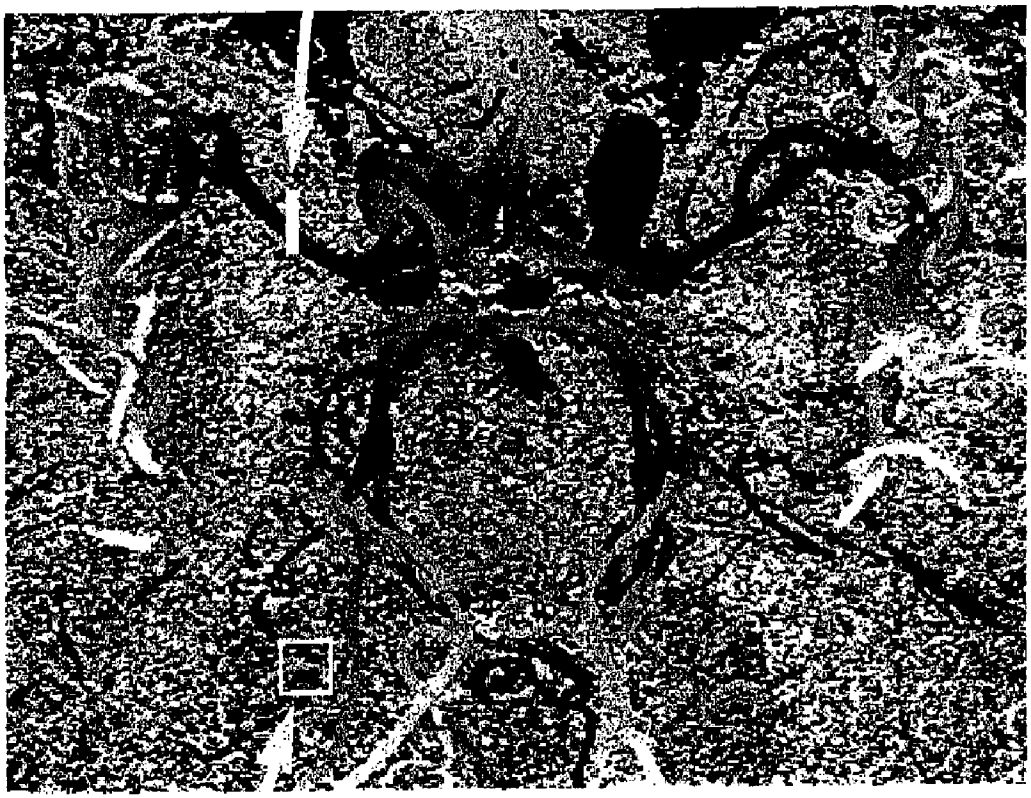
FIG. 4 illustrates a depth-buffer or Z-buffer array corresponding to FIG. 3 in which brightness is proportional to the "Z" location of each point selected for the MIP along each projection line.

In step 218 an array is generated from the original 3D image data by determining the depth or Z-positions of the points included in the MIP image. In this Z-buffer array, the value of each element is related to the distance of the corresponding point in the MIP image from the 2D image plane (i.e. the location of the maximum (or minimum) intensity value along each projection line). FIG. 3 illustrates a standard axial MIP image of a patient having an ophthalmic artery aneurysm. The image was acquired in a 512×256×64 image format and then interpolated to 1024×1024×128, which is shown in step 214. The image is generally considered to have high quality, but the artifacts inherent in the MIP algorithm, such as vessels obscured by other vessels, are visible. FIG. 4 displays the depth-buffer (or Z-buffer) array corresponding to the axial MIP image of FIG. 3. As noted, the Z-buffer array values, displayed here as levels of brightness, are proportional to the depth or "Z" positions of the points that appear in the MIP image of FIG. 3.

The generation of the MIP with the Z-buffer may actually be formed in any direction through the original 3D MRA image data. A convenient direction that is chosen in the samples previously mentioned and that is used in the current embodiment is to perform the MIP in the original slice selection direction. Typically, the path will be along a defined line taken for evaluation, whether it be a straight line, a divergent line, or a curvilinear line, as determined by the operator at the time the evaluation is performed.

Figure 5:
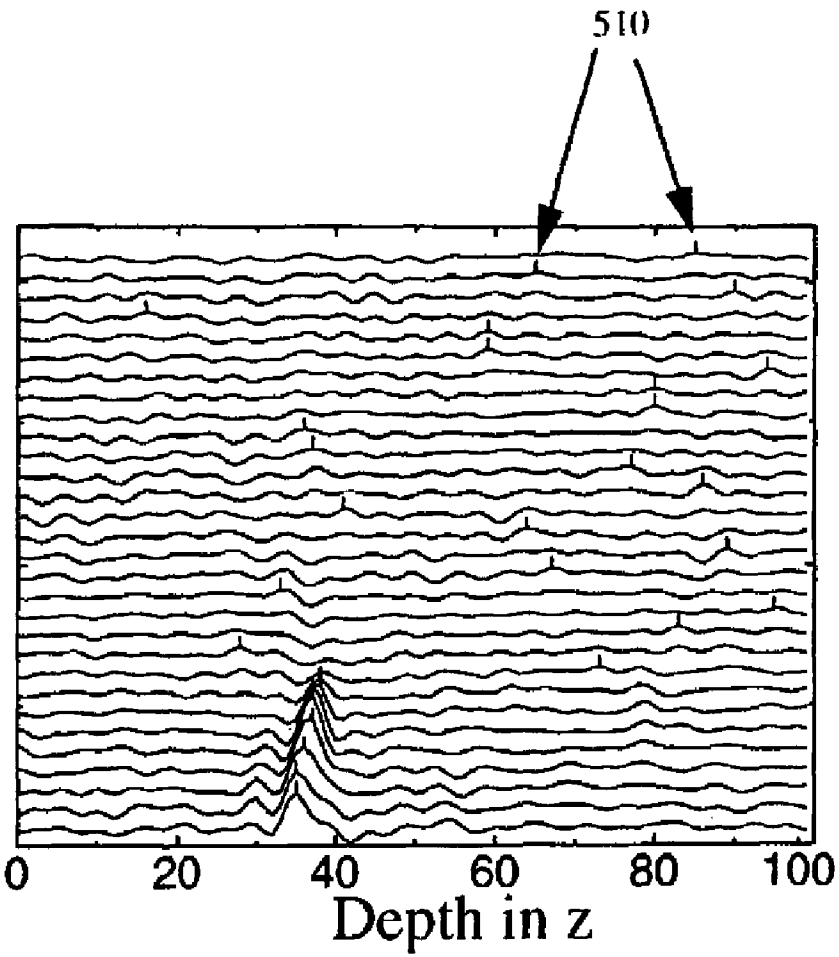
FIG. 5 depicts a plot of the intensity values of the data from the projection lines for the 30 points indicated by the short line that crosses the middle cerebral artery as shown in FIG. 4. The z-locations of the maximum intensity values projected by the MIP algorithm are indicated by the vertical marks.
Figure 8:
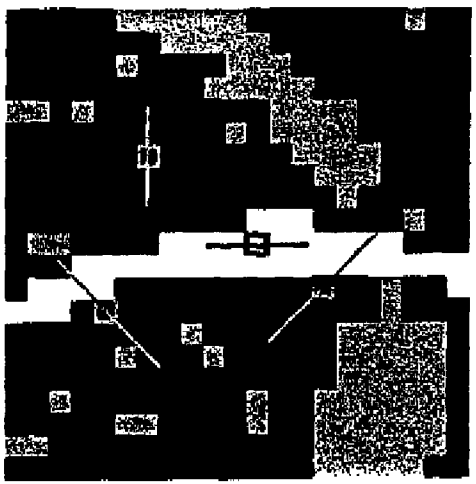
FIGS. 6 through 8 illustrate an expanded view of the small region of the Z-buffer array of FIG. 4 where

FIG. 5 illustrates a plot of signal intensities along the projection lines in the original 3D image data for 30 points taken from FIG. 3. The vertical marks on the 30 plots of FIG. 5 show the positions and values of the points that projected into the MIP image in FIG. 3. Each of these lines corresponds to a point in the vertical bar that crosses the right middle cerebral artery shown in the display of the Z-buffer array of FIG. 4.

Figure 7:
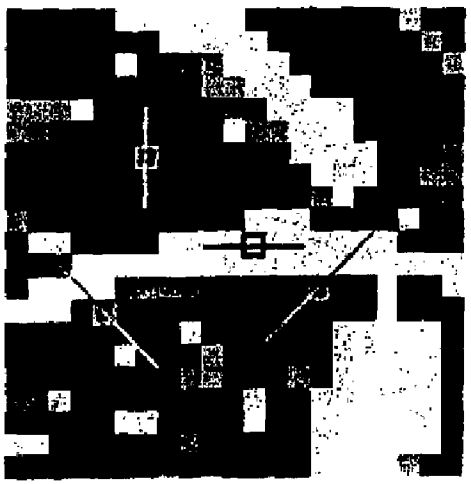

Two observations are made looking at these illustrations. The first is that the vessels exhibit very high continuity in position in the "Z" location. This continuity is used in a primitive vessel detection algorithm that generates a value based on the smoothness in at least one direction around a point. For example, the intensities in the image of FIG. 7 are inversely related to the minimum $\chi^2$ value obtained from the first order fit of 5 points in the four principal directions around each point of FIG. 6, which is a magnified view of the region indicated with a small rectangle in FIG. 4. The four principal directions are defined as 0, 45, 90 and 135 degrees from horizontal in the 2D image plane. For those points where the $\chi^2$ value is low in at least one direction (smooth neighborhood), the image is bright. As will be shown, the vessel segments visible in the MIP of FIG. 3 are all characterized by smoothness and continuity. In view of this, the process of performing depth-buffer segmentation consists in grouping image points based on this smoothness and continuity. The major vessels are characterized by large groups of points.

The second observation is that the apparent width of the vessel "continuity" region in the Z-buffer array display is noticeably wider than the apparent width of the vessels in the MIP image (FIG. 4 as compared to FIG. 3). This difference in width is explained by noting that the slow flow of blood near the vessel edges results in very low signals. Yet, the signals at the vessel edges can still be sufficiently strong to cause many of these edge points to project in the MIP image. Hence, the edge points are present in FIG. 3 even though their brightness is scarcely distinguishable from the background. In the Z-buffer array of FIG. 4, the edge points are seen to have the same depth as the brighter central points of FIG. 3, confirming that they pertain to the same anatomical structure.

The apparatus and process of the present invention measures the local roughness for each element within the Z-buffer array in accordance with step 220. The process measures the roughness (or smoothness), as described below, in the Z-buffer array. In most areas of the Z-buffer array, only pixel groups from vessels exhibit smoothness in one or more directions. To measure the smoothness, the process performs a low order polynomial least squares fit to Z-buffer array values (MIP image Z-locations) in the four principal directions around each point in the Z-buffer array. The four directions are shown in the upper left hand quadrant 600 of FIG. 6. Beginning with the brightest point in the MIP image, every point in the MIP image is tested for classification as vessel based upon local smoothness in the corresponding Z-buffer array. If the element is found to be locally "smooth" the process tests all eight neighbors in two dimensions for additional possible vessel elements. If the neighboring elements are also "smooth" and if they are close in "Z," they are added to the group and their neighbors are added to the list for testing. The process continues until all neighbors to the group are too "rough" or too separated in "Z" to be connected.

The process then considers the next nonclassified, brightest point in the MIP image and tests whether it is a "smooth" element. If this element is smooth, it is defined as the next group and the method repeats the process of looking for additional members to add to this new group. The process continues until all elements in the Z-buffer array have been tested.

Figure 6:
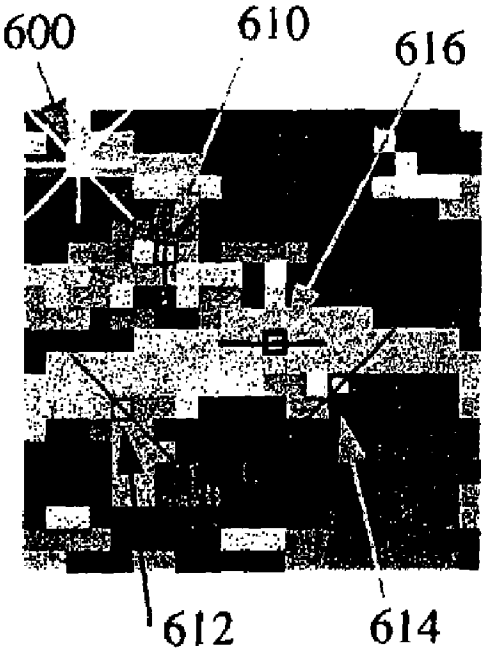

FIG. 6 illustrates an expanded view of a small region of the Z-buffer array of FIG. 4. The four small line segments, segments 610-616, show the length (5 pixels) of the segment used for the first order least squares fit. Points 610 and 614 are outside vessels and yield a high $\chi^2$ value for the fit in any direction. Point 612 is within a vessel, but yields a high value except for the direction parallel to the vessel. Point 616 is within the vessel and yields a low value for three out of four possible directions. FIG. 7 illustrates the same region as FIG. 6, where the image brightness of each pixel is inversely proportional to its minimum calculated roughness value, or $\chi^2$ value, as specified below. The $\chi^2$ value for the fit in the jth direction (j=1, 2, 3, 4) for the ith element in the Z-buffer array is:

$$\chi_{ij}^2 = \sum_k (Z_{ijk} - P_{ijk})^2$$

where $Z_{ijk}$ is the Z-buffer value (depth-buffer value) for element number k (k=1, 2, 3, 4, 5) along the line having element i at its center and direction j. The $P_{ijk}$ corresponds to a predicted value for the same element determined from a low order polynomial fit to the values along the line. The brightness in the array shown in FIG. 7 is then inversely related to the minimum $\chi^2$ value. For each point i and all corresponding lines j=1, 2, 3, 4:

$$\chi_i^2 = \mathrm{MIN}_j(\chi_{ij}^2)$$

and brightness, $V_i$, is $$V_i = A/(B+\chi_i^2)$$

where the constants A and B are empirically determined. The brightness values displayed in FIG. 7 tend to increase with the likelihood that the element is part of a vessel.

Other methods of measuring smoothness in the MIP Z-buffer could be used. The current method involves performing a low order least squares fit to a small number of image elements centered at a particular point. In the current embodiment, the process utilizes a first order fit along five points, and an example of applying the fit in four principal directions is shown in FIG. 6. Alternatively, a different number of points, a different order fit, and a different number of directions may be used in measuring local roughness or smoothness as desired by the system designer. Or the process could be omitted completely in some implementations.

Figure 9:
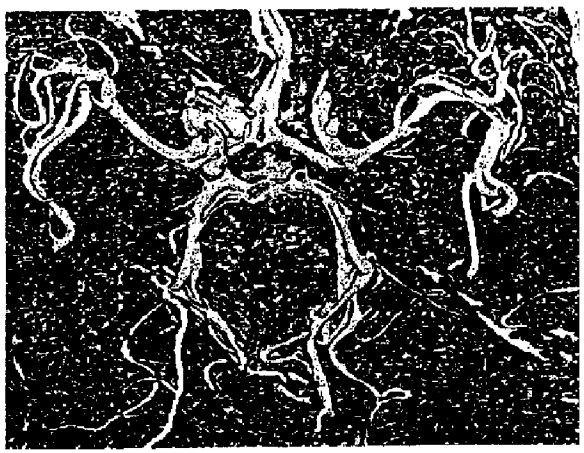
Figure 11:
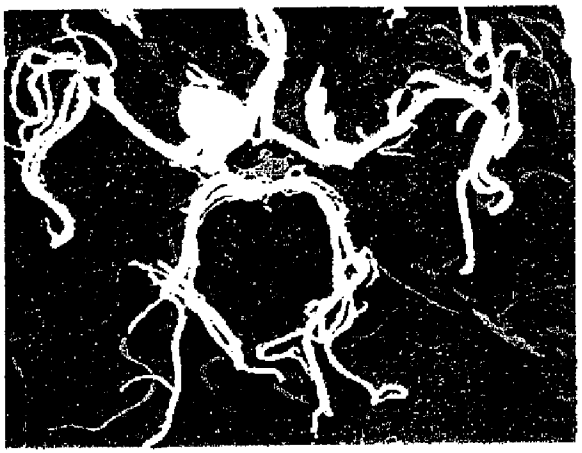

As may be deduced from FIG. 6, only points that are contained within vessels will have a very low $\chi^2$ value. Points just outside the vessel edges generally experience erratic Z-buffer depth values at some point along each of the lines selected for the fit, resulting in high $\chi^2$ values. Because a vessel only requires smoothness in one direction, the process saves only the minimum value of the $\chi^2$ for each point. The minimum $\chi^2$ image is illustrated in. FIG. 9 illustrates an image where the brightness is inversely proportional to the minimum $\chi^2$ value of the least squares fits of short line segments along the principal directions.

Figure 2:
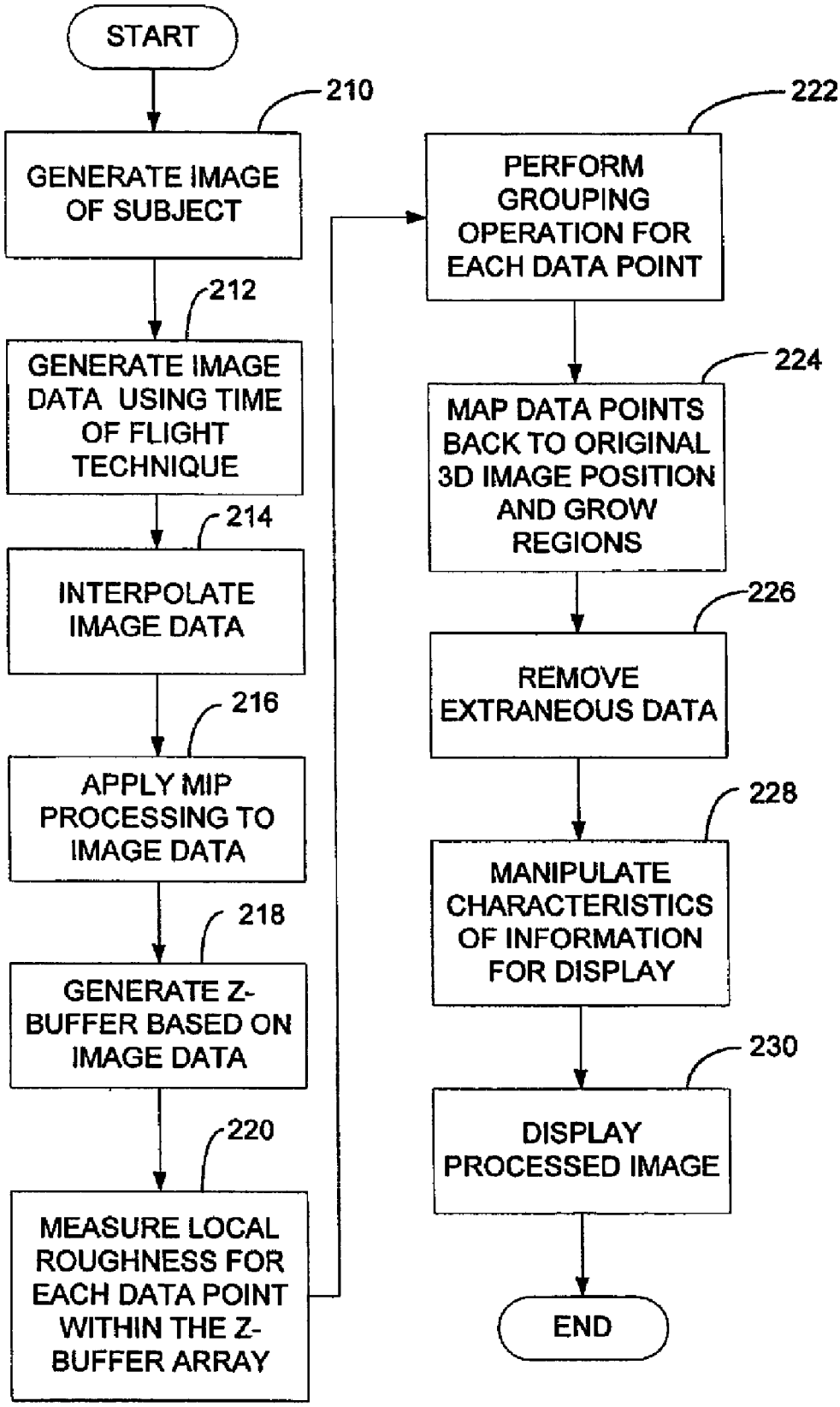
FIG. 2 illustrates a flow diagram of the method steps implemented by the imaging apparatus of FIG. 1 in rendering DBS images in accordance with the present invention.
Figure 13:
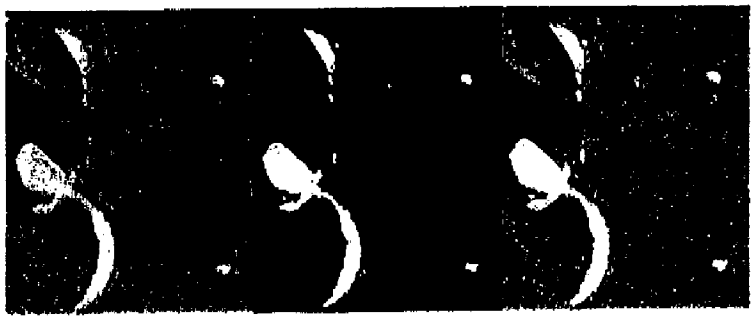
FIGS. 12 through 14 illustrate part of an original 3D image with the corresponding segmented image and also the segmented image overlayed on the original image.
Figure 12:
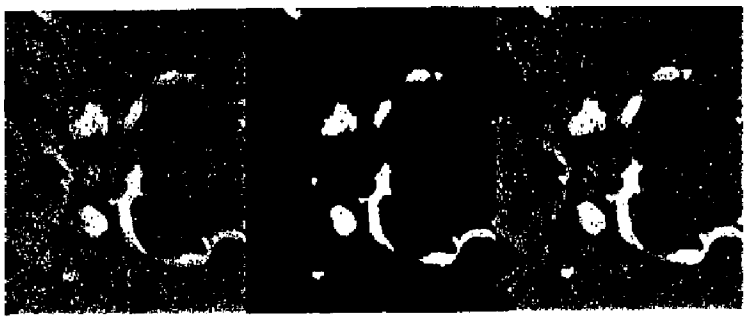
Figure 14:
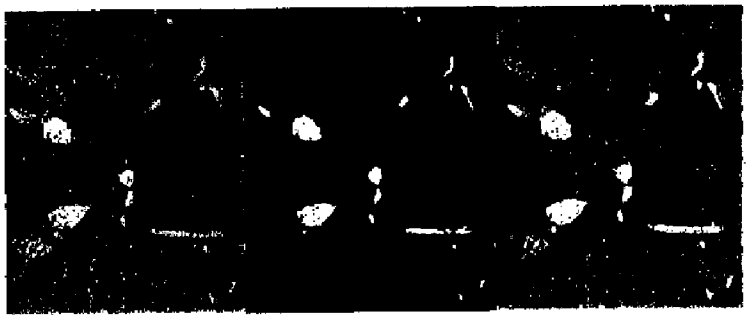

It is then possible to look throughout the minimum $\chi^2$ image for regions of connected "smoothness" as performed in Step 222 of FIG. 2 in order to determine regions that are most likely to be vessels. Such regions are indicated by the grouped image elements of FIGS. 12 through 14. FIGS. 12 through 14 illustrates points in the Z-buffer that are grouped together based upon their low roughness values and proximity. The brightness shown in FIGS. 12 through 14 is proportional to the number of points in each group.

Figure 17:
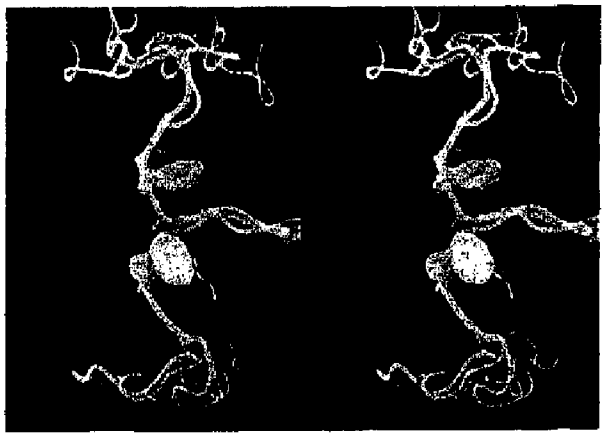
FIGS. 16 through 18 illustrate stereo pair X-ray-like densitometric projections (DPs) of the DBS segmentation corresponding to the image of FIG. 3, where
Figure 16:
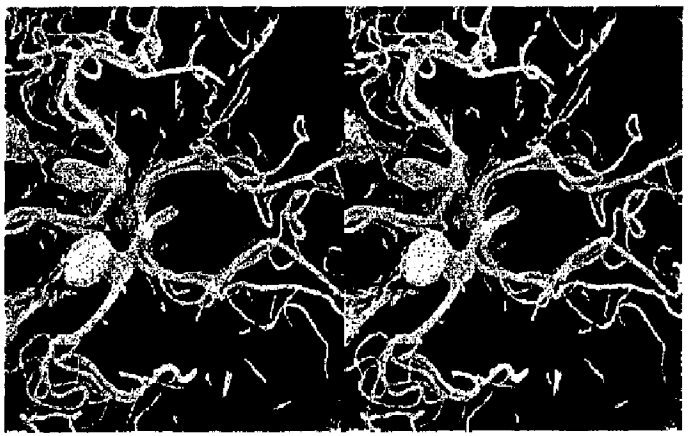
Figure 18:
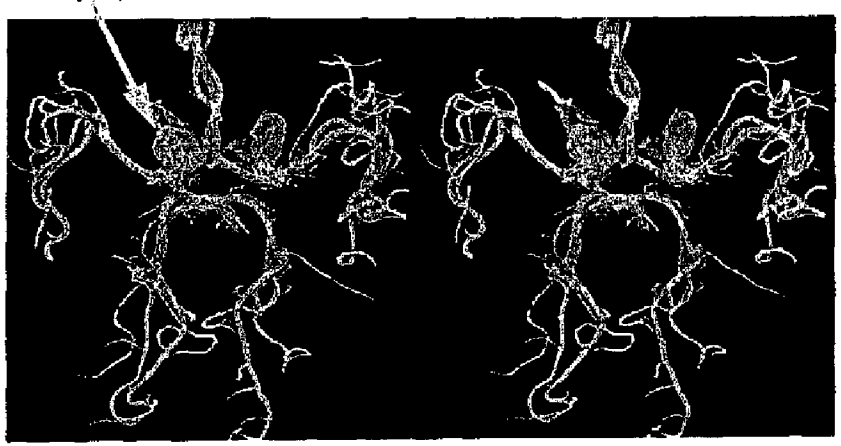
Figure 20:
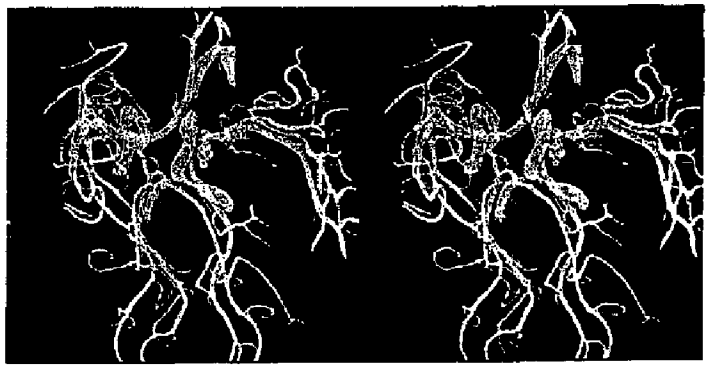
FIGS. 19 through 22 illustrate stereo pair X-ray-like DPs, based on the principles of the present invention, of the intracranial circulation of a patient with a posterior communicating artery aneurysm and a basilar tip aneurysm.

In the implementation of step 222, the process performs a grouping operation where each data point is considered in a specific order. The use of the MIP image implies that the bright parts of the original three dimensional image data were the most important. As such, the process performs the connectivity operations by selecting the brightest image element in the MIP image. This element is tested for a low value in the corresponding minimum $\chi^2$ array. If the minimum $\chi^2$ is below a predefined threshold, the point is selected as a possible vessel and the neighboring points in the 2D MIP image are tested. The brightest element and all of its neighbors and their neighbors, and so forth, which satisfy the connectivity criterion, are added to the group. The process then considers the next non-classified brightest point and determines which remaining neighboring points satisfy the connectivity criterion to form another group. The process continues until all points have been tested. To be connected in this embodiment of the invention, the minimum $\chi^2$ value must be below a given threshold and the Z-position must be within a small distance of the currently considered point. For example, in this illustration, the threshold value for $\chi^2$ equaled 1.0 and a step of +/−2 in Z was allowed. Other values may be selected by the designer according to the needs of the designer, but this step size recognizes that larger vessels occasionally project from different regions within the vessel, and the larger value improves the character of the connectedness. FIGS. 16 through 18 illustrates an image of the points that have been grouped based upon the proximity in "Z" and minimum roughness. The intensity of the display is proportional to the number of points in each group. It is shown that some vessels, although obviously "connected" in real life, are not connected by this implementation of the process (e.g. the middle cerebral artery is not connected to the trifurcation area). These disconnects happen because only one point in a thick vessel is projected by the MIP algorithm, and the thickness of the vessel allows larger jumps in "Z" than are accepted by the connectivity criteria used in this example.

Once all the contiguous groups of minimum roughness are determined in the MIP Z-buffer array, there are still many vessels that are crossed by other vessels and remain broken. Further, only one point per projection line is included in the vessel group. It is therefore useful to map each group of vessel points back to their original three dimensional image positions where a region growing algorithm is utilized for each point in each group to add additional points from the three dimensional image data to each vessel group as shown in step 224. In step 224, to complete the process of connecting all vessels, the groups are mapped back to the three dimensional image space, and all points from the two dimensional groups are considered again in the same order. All neighboring points in the 3D data are tested based upon their intensity being a selected (e.g. two standard deviations) above the average background value. Points that are two standard deviations or more above the average background would have projected in the MIP image had they not been obscured by other brighter structures, such as vessels. By adding these points to the groups, the process fills out the vessels in 3D and also connects most branches that were "disconnected" by being obscured by other vessels. An image of points connected by the process in step 224 is illustrated in 11.

As indicated by step 226, extraneous groups are removed from the set of grouped image points created in step 224. For example, noise groups can be removed automatically by eliminating all groups with very small numbers of elements. In this example, all groups with less than 45 elements were considered to be noise and were removed. All the major vessels subtend more than 45 elements, and very few noise groups have more than 45 elements (voxels). Where groups with large numbers of voxels are not of interest, such as regions of fat or bone or organ tissue in angiographic imaging, they can be eliminated by a manual step, that allows the user to select the groups to be removed and cause those groups not to display.

Figure 15:
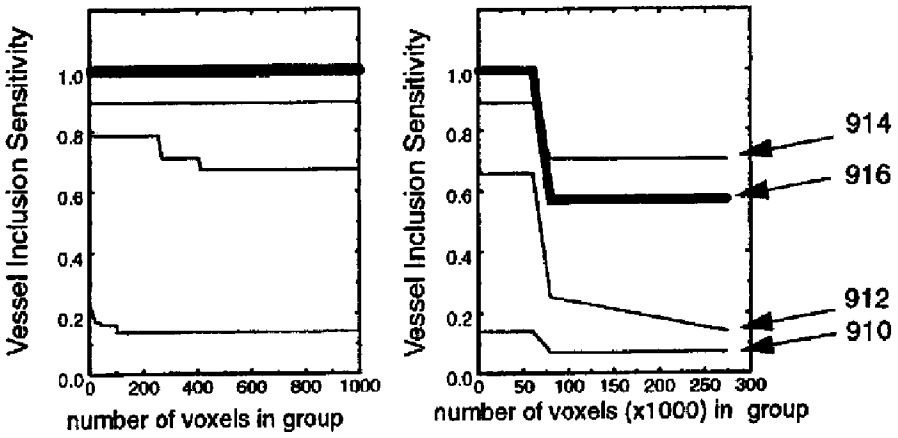
FIG. 15 illustrates the performance of the segmentation based on a vessel and non-vessel classification of the segmented image of FIGS. 12 through 14 as performed by an independent observer.

A qualitative evaluation of the results of the segmentation process can be performed by comparing the elements segmented as belonging to vessels with those seen in the original cross-sectional images. The DBS process performs well in classifying vessel and non-vessel voxels. The misclassifications consist of the smallest vessels that did not appear in the MIP and the centers of the carotid arteries that were dark in the original 3D data. FIGS. 12 through 14 show an example of points in the original 3D image that, as shown in FIG. 15, were manually classified as vessel and non-vessel by an independent observer. The points segmented by the DBS process of the present invention as vessels and non-vessels are shown as white and black regions of points in FIGS. 12 through 14. The manually classified points appear as white points in these same figures. FIG. 15 illustrates graphs of the performance of the segmentation based on the vessel and non-vessel classification of the segmented image of FIGS. 12 through 14 as performed by an independent observer. The graphs represents the vessel inclusion sensitivity as measured by the number of voxels in a group of a few hundred and of ×1000. Line 910 represents very small vessels means only see in local projections. Line 912 represents small vessels as seen in the MIP images. Line 914 represents the medium size secondary bifurcations, M2, A2. Line 916 represents large vessels, such as internal carotid and middle cerebral arteries.

Figure 10:
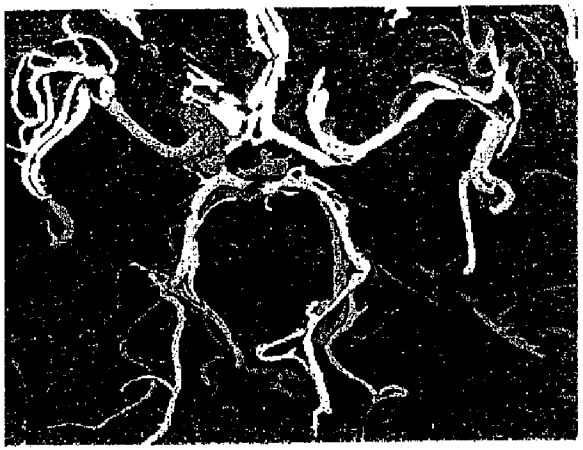
FIGS. 9 through 11 illustrate a series of images where each image represents where

Once all of the data elements have been classified by the DBS algorithm as groups of structures such as vessels, any of the previously mentioned variety of display techniques may be utilized, including MIPs and shaded surface renderings. By displaying the original MRA intensities of only those points classified as vessel, it is straightforward to perform densitometric summations along lines to the original data. The resulting images, as shown in FIGS. 16 through 18, look much like subtraction X-ray angiograms, but the dynamic range is so large that it is hard to portray the vessels at a single window/level setting on a video display. More specifically, FIG. 10 illustrates a stereo pair X-ray-like densitometric projection through DBS process images from the aneurysm study of FIG. 3. FIG. 16 is a stereo pair of the full intracranial circulation while FIG. 17 illustrates a stereo pair of vessels connected to the anterior and middle cerebral arteries. It is difficult to show the full dynamic range of intensities contained in the images of FIGS. 16 and 17. The dynamic range is reduced by removing all points internal to the DBS segmented structures. X-ray-like densitometric projection using the hollow DBS process in accordance with the present invention is shown in FIG. 18. In FIG. 18 some surface shading is also added to the X-ray-like projection image. In FIG. 18, the intracranial carotid artery element 1010 is visible below the aneurysm. Thus, the process manipulates the dynamic range of information for display as shown in step 228 of FIG. 2 to enhance the resolution of the vessel structures of interest during the display.

As just noted, one example of performing dynamic range reduction is to eliminate all data points within the image that have neighbors in every direction. This results in an image where the vessels appear as hollow tubes. Typical displays of densitometric projections through the hollow vessel images are shown in FIG. 18 and in FIGS. 19 through 26. The characterization of the image may be further modified by adding an amount of shading to each vessel surface thereby enabling the observer to determine whether the vessels are near or far, and the vessel orientation is more discernable as well. Once the final manipulation of the dynamic range is performed, the process, as shown in step 230, displays the processed image on an imaging device, such as a video monitor and/or prints the image on a printing apparatus. Optional display processes are contemplated that may yield more visual information. The present embodiment of the invention may not eliminate all noise, but the noise is reduced to the point that the useful data is easily recognized over these noise points.

Figure 19:
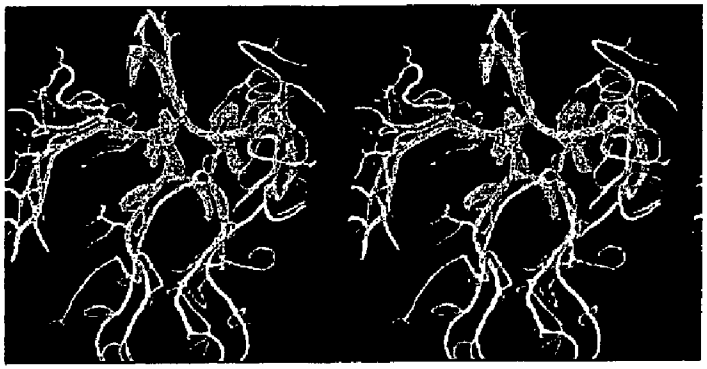

FIGS. 19 through 22 illustrate stereo pair X-ray-like densitometric reprojections of the results of the DBS segmentation of points from the 3D image of a patient with a communicating artery (PCOM) aneurysm and a basilar tip aneurysm. FIG. 19 is the cranial view of the PCOM aneurysm while FIG.

Figure 22:
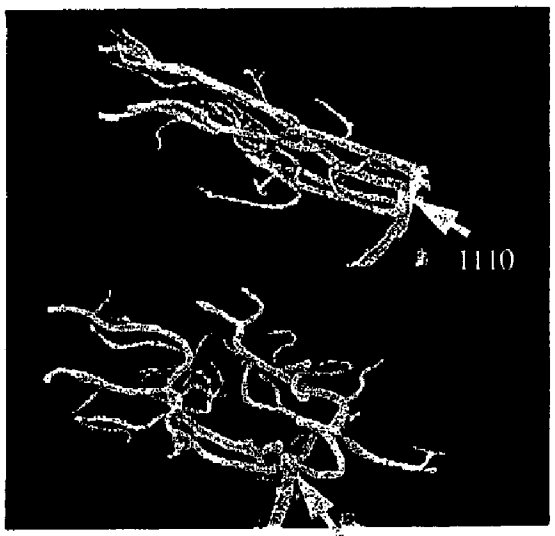
Figure 21:
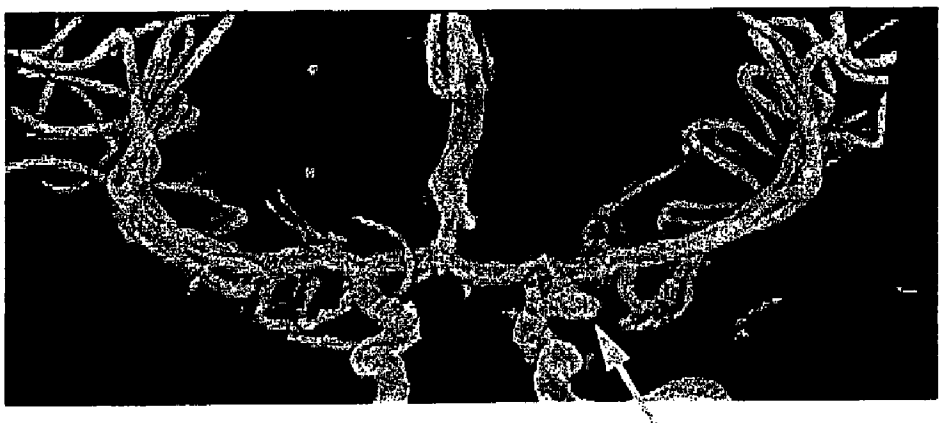

20 is the caudal view. FIG. 21 highlights the posterior communicating artery aneurysm 1108 while FIG. 22 illustrates the highlight of a small basilar tip aneurysm, which is behind tip 1110 and is shown from two different orientation.

Figure 23:
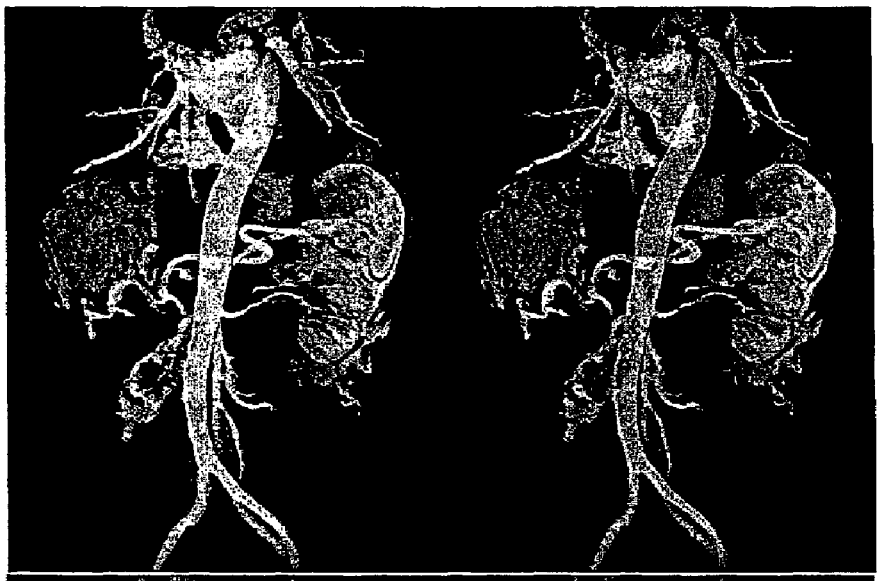
FIGS. 23 through 24 illustrate stereo pair X-ray-like DPs of a contrast enhanced abdominal aorta in accordance with the present invention; and, FIGS. 25 through 26 illustrate a set of CTA images including (A) axial collapse of segmented data structures and (B) shaded hollow-body reprojection in accordance with the present invention.
Figure 24:
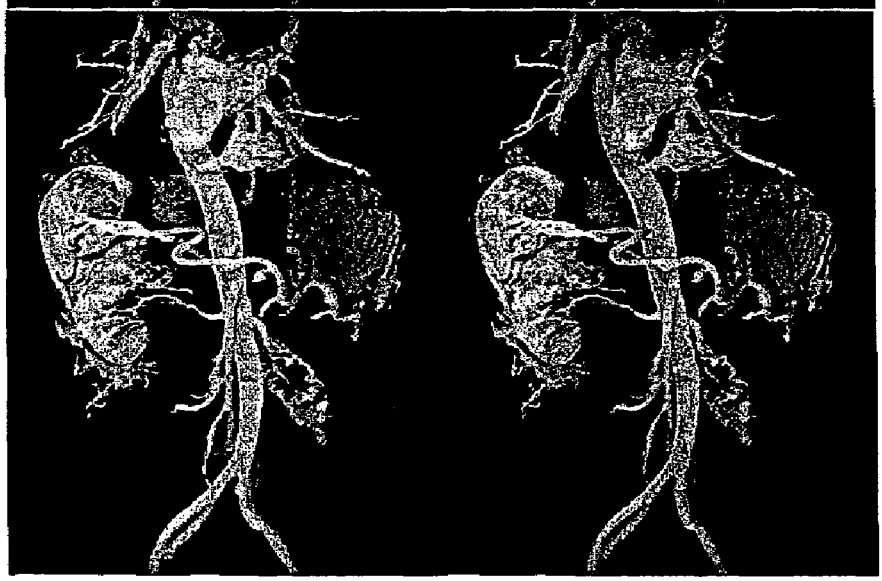

FIGS. 23 through 24 illustrates a stereoscopic X-ray-like densitometric reprojection through a renal artery study in accordance with the present invention. FIG. 23A shows the anterior view while FIG. 24 illustrates the posterior view.

Figure 26:
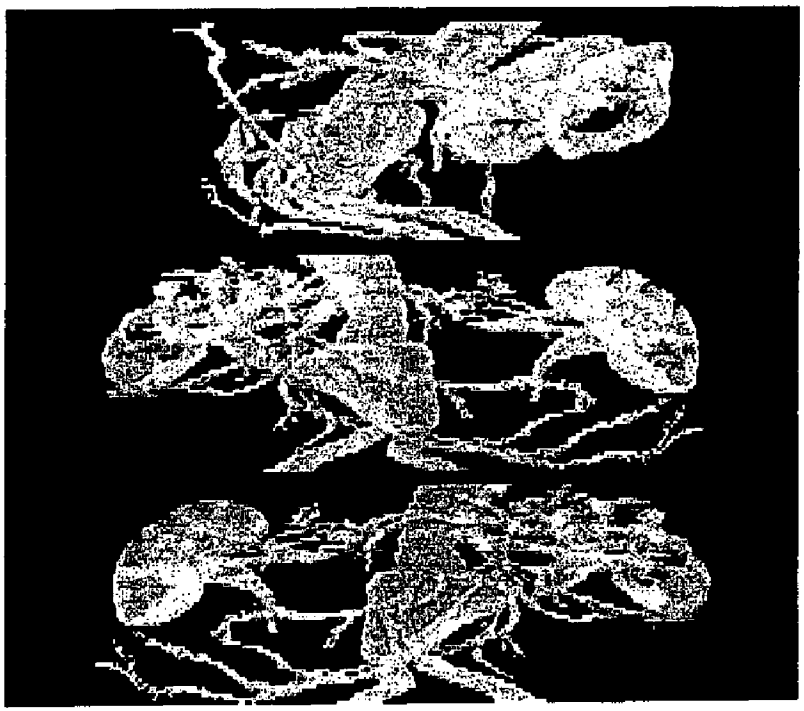
Figure 25:
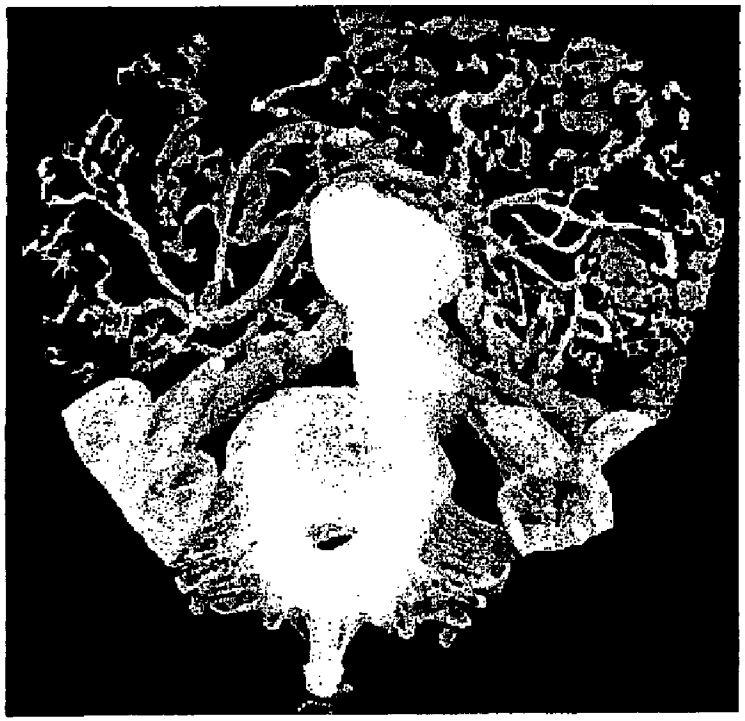

Lastly, FIGS. 25 through 26 represents an example of CTA images acquired at relatively low resolution on a helical CT scanner. Segmentation is performed with the DBS process in accordance with the present invention. FIG. 25 depicts the axial collapse of the segmented data structures, while FIG. 26 illustrates shaded hollow-body reprojections of the aortic aneurysm.

The DBS process as described and presented in the present invention results in an image segmentation process that is readily applicable to magnetic resonance angiography (MRA), computed tomography angiography (CTA), rotational X-ray angiography (XRCTA), and other medical and non-medical applications. Since the DBS process is based upon the generic MIP algorithm, the application of the DBS process can be extended wherever the MIP algorithm is currently being used. The utility of the DBS process can be enhanced to include display options that allow the user to toggle between the DBS process and the preliminary MIP process, as well as other forms of volume rendering. The DBS process is also applicable to such fields as computer assisted screening and image interpretation based upon segmented anatomy.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A method of grouping image data points based on smoothness or roughness values, the method comprising:

creating a reduced-dimensionality image data set from a multidimensional image data set;

selecting a first set of points in the reduced-dimensionality image data set, each point in the first set of points having a corresponding point in a second set of points in the multidimensional image data set;

defining a unique projection path for each point in the first set of points, the projection path extending in a direction Z from a point in the first set of points through the corresponding point in the second set of points;

determining a distance measure for a first point in the first set of points, the distance measure being the distance along the projection path in the Z direction between the first point in the first set of points and the first point's corresponding point in the second set of points;

determining the distance measures for multiple points, including an image point, in the first set of points;

calculating a smoothness or roughness value for the image point in the first set of points by comparing the distance measure of the image point to the distance measures of other points in the first set of points; and grouping the image point with similar points in the first set of points, each of said similar points having both a smoothness or roughness value related to the smoothness or roughness value of the image point.

2. The method according to claim 1, wherein the smoothness or roughness value of the image point is determined using a least squares fit of the distance measures of points in proximity to the image point.

3. The method according to claim 1, wherein a Z-buffer array comprises the distance measures of multiple points in the first set of points.

4. The method according to claim 1, further comprising converting grouped and ungrouped points into a multi-dimensional image.

5. The method according to claim 4, further comprising performing region growing within the multi-dimensional image.

6. The method according to claim 5, further comprising hollowing out the multi-dimensional image.

7. The method according to claim 6, wherein the hollowing out comprises removing each pixel from a group that is surrounded on each side by a pixel from said group.

8. The method according to claim 1, further comprising displaying an image of grouped and ungrouped image points.

9. The method according to claim 1, wherein the multidimensional image data set is a magnetic resonance derived image set.

10. The method according to claim 1, wherein the multidimensional image data set is a computed tomography derived image set.

11. The method according to claim 1, further comprising compensating for variations in sensitivity along projection paths to enhance a projection image.

12. The method according to claim 3, further comprising applying a process to the buffer array to enhance the Z buffer array based upon expected properties of adjacent points in the buffer array.

13. The method according to claim 12, wherein the process comprises measuring array element roughness in a plurality of directions around each array element in the Z buffer array.

14. The method according to claim 1, wherein the projection paths are curvilinear.

15. The method according to claim 1, wherein the projection paths are divergent from a point of origin.

16. The method according to claim 1, wherein the proximity is defined as being no more than two image element positions from the image point.

17. The method according to claim 1, wherein the proximity is based on point adjacency.

18. The method according to claim 1, further comprising manipulating image groups for enhanced display.

19. The method according to claim 18, wherein the image manipulation consists of hollowing image structures.

20. The method according to claim 19, wherein the hollowing step comprises removing voxels in a group that are surrounded in multiple directions by adjacent voxels in the same group.

21. The method according to claim 1, further comprising displaying a resulting image.

22. The method according to claim 21, wherein the display comprises summation of the multi-dimensional image along projection lines.

23. The method according to claim 21, wherein the display comprises shading volume surfaces.

24. The method according to claim 1, further identifying bifurcations or branches of groups segmented from the multidimensional image.

25. The method of claim 1, wherein a corresponding point in the second set of points comprises a maximum intensity value along the corresponding point's projection path.

26. The method of claim 1, wherein a corresponding point in the second set of points comprises a minimum intensity value along the corresponding point's projection path.

27. The method of claim 1, wherein a corresponding point in the second set of points comprises a value above or below a predefined value.

28. The method of claim 27, wherein the corresponding point in the second set of points comprises an intensity value above an average background value.

29. The method of claim 28, wherein the corresponding point in the second set of points comprises an intensity value more than two standard deviations above the average background value.

30. The method according to claim 1, wherein the smoothness or roughness value of the image point is determined using chi-square values of the fit of the distance measures of points in proximity to the image point.

*31. An image processing method comprising:*

*generating a reduced-dimensionality (RD) image data set from a multidimensional (MD) image data set, the RD image data set representing a first set of points each corresponding to a point in a second set of points represented in the MD image data set;*

*using the RD and MD image data sets, determining distance measures for a plurality of projection paths each extending between corresponding points in the first and second sets of points;*

*using the RD image data set, calculating at least one of a smoothness or roughness value for a selected point in the first set of points by comparing a distance measure associated with the selected point to distance measures of other points in the first set of points that are within a predetermined proximity of the selected point; and*

*indicating in the RD image data set at least one grouping of the selected point with other points in the first set of points based on a predefined threshold similarity of the at least one of the smoothness or roughness values.*

*32. The method according to claim 31, further comprising storing the distance measures in a depth buffer array.*

*33. The method according to claim 31, further comprising:*

*identifying in the MD image data set, representations of a subset of points from the second set of points that correspond to the grouping of the selected point with other points in the first set of points;*

*using the MD image data set, determining an intensity of points neighboring each point of the subset of points in the second set of points; and*

*indicating in the MD image data set, an addition of the neighboring points to the subset of points represented in the MD image data set in the second set of points according to the intensity.*

*34. The method according to claim 33, further comprising removing representations of the subset of points from the MD image data set based at least in part on a number of points in the subset.*

*35. The method according to claim 31 further comprising applying maximum intensity projection processing to the MD image data set to generate the RD image data set.*

*36. The method according to claim 31, wherein the MD image data set comprises three dimensional (3D) image data.*

*37. The method according to claim 31, further comprising displaying an image formed by summing the MD image data set along the projection path.*

*38. An apparatus comprising:*

*means for creating a reduced-dimensionality (RD) image data set from a multidimensional (MD) image data set;*

*means for using the RD and MD image data sets to select a first set of points including an image point in the RD image data set, wherein individual points of the first set of points correspond to other individual points in a second set of points in the MD image data set;*

*means for using associated data in the RD and MD image data sets to generate an array comprising array values each corresponding to a distance measure along a projection path extending between a point in the first set of points and an associated point in the second set of points; and*

*means for indicating in the RD image data set at least one grouping of the image point and at least one point adjacent to the image point based on a similarity of at least one of a smoothness or roughness of the array values for the image point and the at least one point adjacent to the image point.*

*39. The apparatus according to claim 38, wherein selecting the image point is based on a comparison of brightness intensity values corresponding to the individual points in the RD image data set.*

*40. The apparatus according to claim 38, further comprising means for displaying the first set of points.*

*41. The apparatus according to claim 38, wherein the at least one of a smoothness or roughness value is based on a least squares fit analysis of a predetermined number of the array values of the array, wherein the predetermined number of the array values are centered by an array value corresponding to the image point and wherein the least squares fit analysis is performed on the array values in a predetermined number of directions.*

*42. The apparatus according to claim 38, further comprising:*

*means for using associated data in the RD and MD image data sets to map the grouping in the first set of points to a subset of corresponding points in the second set of points; and*

*means for adding a new point to the subset from the second set of points based on a predetermined variance of a brightness intensity of the new point in comparison to an average brightness intensity of other points in the second set of points.*

*43. The apparatus according to claim 42, wherein the predetermined variance is two standard deviations.*

*44. The apparatus according to claim 38, wherein the means for creating the RD image data set from the MD image data set comprises a means for applying maximum intensity projection processing to the MD image data set to create the RD image data set.*

*45. An article of manufacture comprising a non-transitory computer-readable medium having stored thereon computer-executable instructions that configure a processing device to:*

*generate a reduced dimensionality (RD) image data set from a multidimensional (MD) image data set, the RD image data set comprising representations of individual points of a first set of points, the MD image data set comprising representations of a second set of points;*

*identify individual points of the first set of points each corresponding to different individual points of the second set of points, the corresponding points forming a point pair;*

*determine a spatial relationship between the corresponding points for each point pair by comparing spatial data associated with the first set of points to spatial data associated with the second set of points;*

*select a first image point in the first set of points based on intensity data, the first image point associated with a first image point pair; and*

*group points from the first set of points with the first image point to form a first group according to a comparison of a spatial relationship of the first image point pair to a spatial relationship of point pairs proximate the first image point pair.*

*46. The article of manufacture according to claim 45, wherein the computer-executable instructions further configure the processing device to add points from the first set of points to the first group based on a comparison of spatial relationships of point pairs proximate different point pairs associated with the first group.*

*47. The article of manufacture according to claim 45, wherein the computer-executable instructions further configure the processing device to:*

*compare a disparity between the spatial relationships of point pairs in the first group;*

*remove one or more points from the first group based on the disparity; and*

*select a second image point in the second set of points, wherein the second image point corresponds to the first image point based on intensity data of the second image point, the second image point associated with a second image point pair.*

*48. The article of manufacture according to claim 47, wherein the computer-executable instructions further configure the processing device to group points proximate the second image point with the second image point to form a second group according to a comparison of a spatial relationship of the second image point pair to spatial relationships of point pairs associated with the points proximate the second image point.*

*49. An apparatus comprising:*

*an imaging device configured to generate a multi-dimensional (MD) image data set representing an object; and*

*one or more image processors configured to:*

*generate a reduced-dimensionality (RD) image data set from the MD image data set,*

*wherein the RD image data set represents a first set of points each corresponding to a point in a second set of points represented in the MD image data set,*

*wherein each point in the second set of points is associated with a minimum or maximum intensity value along a representation of a projection path extending from a point in the first set of points, the corresponding points in the first and second sets of points forming a point pair,*

*using the RD and MD image data sets, identify an image point in the first set of points by comparing intensity values of corresponding points in the second set of points;*

*generate a buffer array comprising a value for each point in the first set of points, the value corresponding to each point pair associated with the first set of points, wherein the value is a distance measurement between corresponding points of the point pair;*

*calculate at least one of a smoothness or roughness value for points in the first set of points based on buffer array values; and*

*group particular points in the first set of points with the image point based on a predetermined threshold similarity of smoothness or roughness.*

*50. The apparatus according to claim 49, wherein the one or more image processors are further configured to:*

*using the RD and MD image data sets, identify additional image points among ungrouped points in the first set of points, in order according to intensity values of points in the second set of points corresponding to the ungrouped points in the first set of points; and*

*group other points in the first set of points with one of the additional image points based on the predetermined threshold similarity of smoothness or roughness to identify an additional group.*

*51. The apparatus according to claim 49, wherein the one or more image processors are further configured to:*

*using the RD and MD image data sets, map the grouped points in the first set of points to a corresponding group of points in the second set of points;*

*determine a relative intensity of points in the second set of points neighboring the corresponding group of points, the intensity measured with respect to a reference background; and*

*add neighboring points to the corresponding group of points based on the relative intensity.*

*52. The apparatus according to claim 51, wherein the one or more image processors are further configured to remove the group from the first set of points associated with the RD image data set, based on a threshold number of points defining a valid group.*

*53. The apparatus according to claim 52, wherein the one or more image processors are further configured to cause a computer to display the resulting RD image data set.*

*54. The apparatus according to claim 49, wherein the imaging device is a magnetic resonance imaging device.*

*55. The apparatus according to claim 49, wherein the imaging device is a computed tomography imaging device.*

*56. The apparatus according to claim 49, wherein the imaging device is an X-ray computed tomography angiography imaging device.*

*57. A system comprising:*

*an imaging device configured to generate a three dimensional (3D) image data set representing a 3D image; and*

*one or more image processors configured to;*

*generate a two dimensional (2D) image data set representing a 2D image generated from the 3D image data set, wherein the 2D image data set represents a plurality of 2D points on a plane bisecting a plurality of 3D points represented in the 3D image data set;*

*assigning an intensity value to each of the plurality of 2D points represented in the 2D image data set, wherein the intensity values are each associated with a minimum or maximum intensity value of a corresponding 3D point represented in the 3D image data set,*

*wherein the representation of the corresponding 3D point is along a representation of a projection path including a 2D point of the plurality of 2D points and the corresponding 3D point represented in the 2D and 3D image data sets;*

*generate a depth buffer array comprising depth measures for each of the plurality of 2D points represented in the 2D image data set,*

*wherein the depth measures for each of the plurality of 2D points are measured with respect to the corresponding 3D point represented in the 3D image data set;*

*compare one or more intensity values and depth measures; and*

*group the one or more 2D points represented in the 2D image data set into one or more anatomical structure groups and one or more background groups based on the comparison.*

*58. The system according to claim 57, wherein the one or more image processors are further configured to:*

*group the 3D points represented in the 3D image data set by mapping 2D points represented in the 2D image data set corresponding to the one or more anatomical structure groups to corresponding to 3D points represented in the 3D image data set;*

*determine an intensity of 3D points neighboring grouped 3D points represented in the 3D image data set; and*

*add the neighboring 3D points to the grouped 3D points based on the intensity of the neighboring 3D points.*

*59. The system according to claim 57, wherein the one or more image processors are further configured to remove representations of 2D points associated with the one or more background groups from the 2D image data set.*

*60. The system according to claim 58, wherein the one or more image processors are further configured to remove one or more points from the grouped 3D points represented in the 3D image data set if the point to be removed is bordered on each side by a 3D point also belonging to grouped 3D points represented in the 3D image data set; and*

*further comprising a display configured to display a resulting 3D image.*

*61. A method comprising:*

*generating a depth buffer array configured to associate a threshold intensity value and position of one or more representations of points along parallel projections in a multidimensional image data set;*

*segmenting the representations of points in a reduced-dimensionality image data set into one or more groups corresponding to the depth buffer array values, wherein the reduced-dimensionality image data set corresponds to the multidimensional image data set;*

*removing a subset of the one or more groups from the reduced-dimensionality image data set according to a number of points in a group; and*

*generating a two dimensional image based on remaining groups in the reduced-dimensionality image data set.*

*62. The method according to claim 61, further comprising:*

*mapping representations of points of the remaining groups to one or more corresponding representations of points in the multidimensional image data set to form one or more associated groups;*

*determining an intensity value for representations of points proximate the representations of points of the one or more associated groups in the multidimensional image data set, the intensity measured with respect to a reference background; and*

*adding the neighboring points to the group based on the intensity.*

*63. A method for isolating image elements depicting an anatomical structure, comprising:*

*formulating a set of projection paths through points represented in a multidimensional image data set including the anatomical structure;*

*forming a set of representations of image points by selecting individual image points for the set along each projection path represented in the multidimensional image data set based on intensity values corresponding to the points represented in the multidimensional image data set;*

*determining whether each image point of the set of image points represented in the multidimensional image data set corresponds to an image element depicting the anatomical structure based on a smoothness and continuity of each image point represented in the multidimensional image data set; and*

*grouping image points of the set of image points represented in the multidimensional image data set that correspond to image elements represented in the multidimensional image data set depicting the at least one anatomical structure.*

*64. The method according to claim 63, wherein determining further comprises analyzing the smoothness and continuity of the image point represented in the multidimensional image data set with respect to at least one adjacent image point also represented in the multidimensional image data set.*

*65. The method according to claim 64, wherein analyzing further comprises comparing a similarity of continuity between the image point represented in the multidimensional image data set and the at least one adjacent image point also represented in the multidimensional image data set.*

*66. The method according to claim 64, wherein analyzing further comprises comparing a similarity of smoothness between the image point represented in the multidimensional image data set and the at least one adjacent image point also represented in the multidimensional image data set.*

*67. The method according to claim 66, wherein the at least one anatomical structure is a blood vessel.*

*68. The method according to claim 1, the multidimensional image data set representing an image of an anatomical structure.*

* * * * *

UNITED STATES PATENT AND TRADEMARK OFFICE

CERTIFICATE OF CORRECTION

PATENT NO. : RE43,225 E
APPLICATION NO. : 12/249583
DATED : March 6, 2012
INVENTOR(S) : Parker et al.

It is certified that error appears in the above-identified patent and that said Letters Patent is hereby corrected as shown below:

Column 1, line 21, delete "PCT US00/10532," and insert -- PCT/US00/10532, --.

Column 14, line 32, in Claim 12, delete "Z buffer" and insert -- Z-buffer --.

Column 14, line 37, in Claim 13, delete "Z buffer" and insert -- Z-buffer --.

Column 16, line 55, in Claim 45, delete "*reduced dimensionality*" and insert -- *reduced-dimensionality* --.

Column 17, line 48, in Claim 49, delete "*pair*," and insert -- *pair;* --.

Column 18, line 37, in Claim 57, delete "*configured to;*" and insert -- *configured to:* --.

Column 18, line 60, in Claim 57, delete "*more intensity values and depth*" and insert -- *more of the intensity values and the depth* --.

Column 19, line 4, in Claim 58, delete "*to corresponding to 3D*" and insert -- *to corresponding 3D* --.

Column 20, lines 23-24, in Claim 63, delete "*the at least one anatomical*" and insert -- *the anatomical* --.

Column 20, lines 41-42, in Claim 67, delete "*the at least one anatomical*" and insert -- *the anatomical* --.

Signed and Sealed this
Eleventh Day of September, 2012

David J. Kappos

David J. Kappos
*Director of the United States Patent and Trademark Office*